(12) United States Patent
Burlatsky et al.

(10) Patent No.: US 10,596,526 B2
(45) Date of Patent: Mar. 24, 2020

(54) ION-EXCHANGE MEMBRANE WITH MOLECULAR BARRIER

(71) Applicant: United Technologies Corporation, Farmington, CT (US)

(72) Inventors: Sergei F. Burlatsky, West Hartford, CT (US); Vadim Atrazhev, Moscow (RU); Wei Xie, East Hartford, CT (US); Robert Mason Darling, South Windsor, CT (US); Michael L. Perry, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 267 days.

(21) Appl. No.: 15/568,497

(22) PCT Filed: Apr. 24, 2015

(86) PCT No.: PCT/US2015/027437
§ 371 (c)(1),
(2) Date: Oct. 23, 2017

(87) PCT Pub. No.: WO2016/171707
PCT Pub. Date: Oct. 27, 2016

(65) Prior Publication Data
US 2018/0147541 A1 May 31, 2018

(51) Int. Cl.
*B01D 71/32* (2006.01)
*B01D 67/00* (2006.01)
(Continued)

(52) U.S. Cl.
CPC ......... *B01D 71/32* (2013.01); *B01D 67/0009* (2013.01); *C08J 5/22* (2013.01);
(Continued)

(58) Field of Classification Search
CPC .... B01D 67/0009; B01D 69/02; B01D 71/32; B01D 2325/24; H01M 8/102;
(Continued)

(56) References Cited

U.S. PATENT DOCUMENTS

| | | |
|---|---|---|
| 4,093,568 A | 6/1978 | Seko et al. |
| 4,168,216 A | 9/1979 | Burkhardt et al. |
| 5,637,135 A | 6/1997 | Ottenstein et al. |
| 6,858,351 B2 | 2/2005 | Miura et al. |
| 8,187,765 B2 | 5/2012 | Kodama et al. |

(Continued)

FOREIGN PATENT DOCUMENTS

| | | |
|---|---|---|
| CN | 101759832 B | 5/2012 |
| EP | 0059522 A1 | 9/1982 |

(Continued)

OTHER PUBLICATIONS

International Preliminary Report on Patentability for PCT/US2015/027437 dated Aug. 25, 2017.
(Continued)

*Primary Examiner* — John Kim
(74) *Attorney, Agent, or Firm* — Carlson, Gaskey & Olds, P.C.

(57) ABSTRACT

Disclosed is an ion-exchange membrane that includes a molecular barrier for influencing permeation selectivity through the membrane. The membrane includes fluorinated carbon backbone chains and fluorinated side chains that extend off of the fluorinated carbon backbone chains. The fluorinated side chains include acid groups for ionic conductivity. The acid groups surround and define permeable domains that are free of the fluorinated carbon backbone chains. Molecular barriers are located in the permeable domains and influence permeability through the domains.

20 Claims, 4 Drawing Sheets

(51) Int. Cl.
*B01D 69/02* (2006.01)
*C08J 5/22* (2006.01)
*H01M 8/102* (2016.01)
*H01M 8/1039* (2016.01)
*H01M 8/1044* (2016.01)

(52) U.S. Cl.
CPC .......... *C08J 5/2237* (2013.01); *C08J 5/2293* (2013.01); *H01M 8/102* (2013.01); *H01M 8/1039* (2013.01); *H01M 8/1044* (2013.01); *B01D 69/02* (2013.01); *B01D 2325/24* (2013.01); *C08J 2327/12* (2013.01); *C08J 2327/18* (2013.01)

(58) Field of Classification Search
CPC ...... H01M 8/1039; H01M 8/1044; C08J 5/22; C08J 5/2237; C08J 5/2293; C08J 2327/12; C08J 2327/18
See application file for complete search history.

(56) References Cited

U.S. PATENT DOCUMENTS

2004/0242708 A1   12/2004   Hasegawa et al.

FOREIGN PATENT DOCUMENTS

| EP | 2583746 A1 | 4/2013 |
| WO | 2004045005 | 5/2004 |
| WO | 2011075135 | 6/2011 |

OTHER PUBLICATIONS

International Search Report for International Application No. PCT/US2015/027437 completed Aug. 28, 2015.
International Preliminary Report on Patentability for International Application No. PCT/US2015/027437 dated Aug. 25, 2017.
Supplementary European Search Report for European Application No. 15890107.4 completed Dec. 3, 2018.

ION-EXCHANGE MEMBRANE WITH MOLECULAR BARRIER

STATEMENT REGARDING FEDERALLY SPONSORED RESEARCH OR DEVELOPMENT

This invention was made with government support under contract number DE-AR0000149 awarded by the United States Department of Energy. The government has certain rights in the invention.

BACKGROUND

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A typical flow battery includes a redox flow cell that has a negative electrode and a positive electrode separated by an electrolyte layer, which may include a separator, such as an ion-exchange membrane. A negative fluid electrolyte (sometimes referred to as the anolyte) is delivered to the negative electrode and a positive fluid electrolyte (sometimes referred to as the catholyte) is delivered to the positive electrode to drive electrochemically reversible redox reactions. Upon charging, the electrical energy supplied causes a chemical reduction reaction in one electrolyte and an oxidation reaction in the other electrolyte. The separator prevents the electrolytes from freely and rapidly mixing but permits selected ions to pass through to complete the redox reactions. Upon discharge, the chemical energy contained in the liquid electrolytes is released in the reverse reactions and electrical energy can be drawn from the electrodes. Flow batteries are distinguished from other electrochemical devices by, inter alia, the use of externally-supplied, fluid electrolyte solutions that include reactants that participate in reversible electrochemical reactions.

SUMMARY

An ion-exchange membrane according to an example of the present disclosure includes fluorinated carbon backbone chains, and fluorinated side chains extending off of the fluorinated carbon backbone chains. The fluorinated side chains include acid groups for ionic conductivity. The acid groups surround and define permeable domains which are free of the fluorinated carbon backbone chains and molecular barriers in the permeable domains and influencing permeability through the permeable domains.

In a further embodiment of any of the foregoing embodiments, the molecular bathers include carbon chain molecules covalently bonded to the acid groups and that extend off of the acid groups away from the fluorinated carbon backbone chains.

In a further embodiment of any of the foregoing embodiments, the carbon chain molecules include polar moieties In a further embodiment of any of the foregoing embodiments, the polar moieties include at least one hydroxyl moiety.

In a further embodiment of any of the foregoing embodiments, the carbon chain molecules are selected from the group consisting of nonoxynol-9, pentaethylene glycol monodecyl ether, monolaurin, and combinations thereof.

In a further embodiment of any of the foregoing embodiments, the molecular barriers include molecules that are molecularly caged within the permeable domains.

In a further embodiment of any of the foregoing embodiments, the molecules include polar moieties.

In a further embodiment of any of the foregoing embodiments, the polar moieties include at least one hydroxyl moiety.

In a further embodiment of any of the foregoing embodiments, the molecules are selected from the group consisting of nonoxynol-9, pentaethylene glycol monodecyl ether, monolaurin, and combinations thereof.

In a further embodiment of any of the foregoing embodiments, the molecules include silicon.

In a further embodiment of any of the foregoing embodiments, the molecules include siloxane.

A flow battery according to an example of the present disclosure includes at least one cell including a first electrode, a second electrode spaced apart from the first electrode and an electrolyte separator layer arranged between the first electrode and the second electrode, and a supply/storage system external of the at least one cell. The supply/storage system includes first and second vessels fluidly connected with the at least one cell, and first and second fluid electrolytes in the supply/storage system. The electrolyte separator layer includes an ion-exchange membrane of a polymer comprising fluorinated carbon backbone chains, and fluorinated side chains extending off of the fluorinated carbon backbone chains. The fluorinated side chains include acid groups for ionic conductivity. The acid groups surround and define permeable domains which are free of the fluorinated carbon backbone chains, and molecular bathers in the permeable domains and influencing permeability through the permeable domains.

A method of fabricating an ion-exchange membrane according to an example of the present disclosure includes providing a polymer membrane that has fluorinated carbon backbone chains and fluorinated side chains extending off of the fluorinated carbon backbone chains. The fluorinated side chains include acid groups for ionic conductivity. The acid groups surround and define permeable domains which are free of the fluorinated carbon backbone chains, and infiltrate the polymer membrane with an additive that includes a precursor. The additive infiltrates into the permeable domains, and chemically converts the precursor to form molecular barriers in the permeable domains.

In a further embodiment of any of the foregoing embodiments, the infiltrating includes soaking the polymer membrane in a solution that contains the additives.

In a further embodiment of any of the foregoing embodiments, the converting is by sol-gel conversion.

A further embodiment of any of the foregoing embodiments includes, prior to the infiltrating with the additive, infiltrating the polymer membrane with water.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
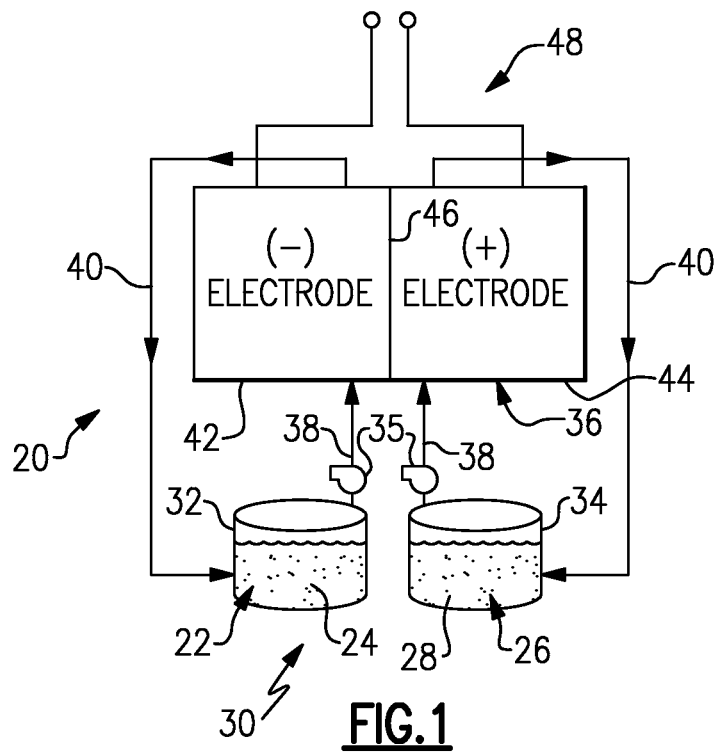
FIG. 1 illustrates an example flow battery.

FIG. 1 schematically shows portions of an example flow battery 20 for selectively storing and discharging electrical energy. As an example, the flow battery 20 can be used to convert electrical energy generated in a renewable energy system to chemical energy that is stored until a later time when there is greater demand, at which time the flow battery 20 then converts the chemical energy back into electrical energy. The flow battery 20 can supply the electric energy to an electric grid, for example.

The flow battery 20 includes a fluid electrolyte 22 that has an electrochemically active species 24 that functions in a redox pair with regard to an additional fluid electrolyte 26 that has an electrochemically active species 28. The electrochemically active species 24/28 include ions of elements that have multiple, reversible oxidation states in a selected liquid solution, such as but not limited to, aqueous solutions or dilute aqueous acids, such as 1-5M sulfuric acid. In some examples, the multiple oxidation states are non-zero oxidation states, such as for transition metals including but not limited to vanadium, iron, manganese, chromium, zinc, molybdenum and combinations thereof, and other elements including but not limited to sulfur, cerium, lead, tin, titanium, germanium and combinations thereof. In some examples, the multiple oxidation states can include the zero oxidation state if the element is readily soluble in the selected liquid solution in the zero oxidation state. Such elements can include the halogens, such as bromine, chlorine, and combinations thereof. The electrochemically active species 24/28 could also be organic molecules that contain groups that undergo electrochemically reversible reactions, such as quinones. That is, in one example, the electrochemically active species 24/28 are differing oxidation or valence states of vanadium, and in another example the electrochemically active species 24/28 are differing oxidation or valence states of iron. The fluid electrolytes 22/26 are liquid solutions that include the electrochemically active species 24/28. The first fluid electrolyte 22 (e.g., the negative electrolyte) and the second fluid electrolyte 26 (e.g., the positive electrolyte) are contained in a supply/storage system 30 that includes first and second vessels 32/34 and pumps 35.

The fluid electrolytes 22/26 are delivered using the pumps 35 to at least one cell 36 of the flow battery 20 through respective feed lines 38 and are returned from the cell 36 to the vessels 32/34 via return lines 40. The feed lines 38 and the return lines 40 connect the vessels 32/34 with first and second electrodes 42/44. Multiple cells 36 can be provided as a stack.

The cell 36 includes the first electrode 42, the second electrode 44 spaced apart from the first electrode 42, and a hydrated ion-exchange membrane 46 arranged between the first electrode 42 and the second electrode 44. For example, the electrodes 42/44 are porous carbon structures, such as carbon paper or felt. In general, the cell or cells 36 can include bipolar plates, manifolds and the like for delivering the fluid electrolytes 22/26 through flow field channels to the electrodes 42/44. The bipolar plates can be carbon plates, for example. It is to be understood however, that other configurations can be used. For example, the cell or cells 36 can alternatively be configured for flow-through operation where the fluid electrolytes 22/26 are pumped directly into the electrodes 42/44 without the use of flow field channels.

The hydrated ion-exchange membrane 46 prevents the fluid electrolytes 22/26 from freely and rapidly mixing but permits selected ions to pass through to complete the redox reactions while electrically isolating the electrodes 42/44. In this regard, the fluid electrolytes 22/26 are generally isolated from each other during normal operation, such as in charge, discharge and shutdown states. In one example, the hydrated ion-exchange membrane 46 has a specific conductivity of 0.01 to 0.2 S/cm at 25° C. under 100% relative humidity. In a further example, the hydrated ion-exchange membrane 46 has an average thickness of 25-178 micrometers and is relatively uniform in thickness.

The fluid electrolytes 22/26 are delivered to the cell 36 to either convert electrical energy into chemical energy or, in the reverse reaction, convert chemical energy into electrical energy that can be discharged. The electrical energy is transmitted to and from the cell 36 through an electric circuit 48 that is electrically coupled with the electrodes 42/44.

The chemical structure below (Structure I) illustrates a basic, unmodified polymer structure of the ion-exchange membrane 46. The polymer structure includes a fluorinated carbon backbone chain and fluorinated side chains that extend off of the carbon backbone chain. The fluorinated side chains include acid groups for ionic conductivity. In this example, the acid groups are sulfonic acid groups and the polymer is perfluorosulfonic acid.

Structure I

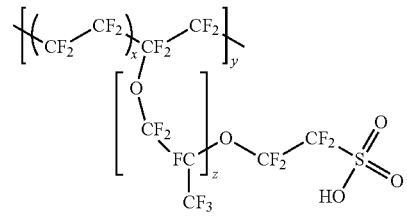

Figure 2:
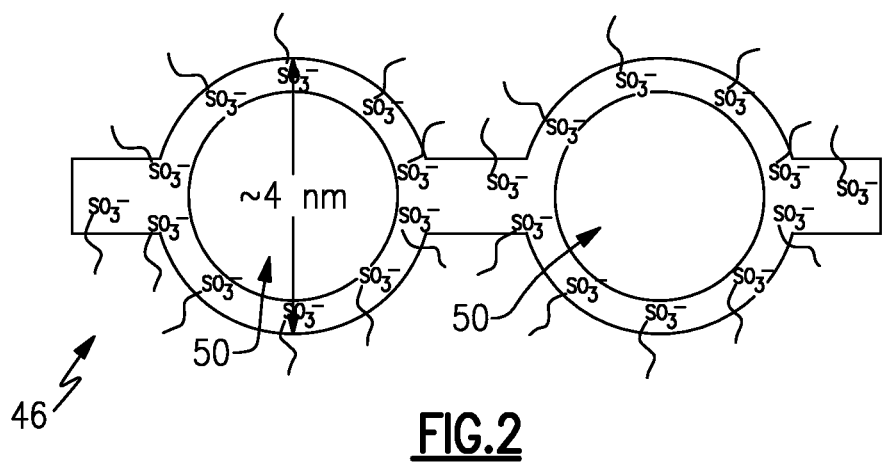
FIG. 2 illustrates a selected portion of a membrane with acid groups that surround and define permeable domains.

The acid groups are hydrophilic such that the polymer can be infiltrated with water. For example, FIG. 2 schematically illustrates the ion-exchange membrane 46 in which the acid groups, here sulfonic acid groups, surround and define permeable domains 50 which are free of both the fluorinated carbon backbone chains and of the fluorinated carbon side chains (that are depicted as "tails" attached to the sulfonic acid groups in FIG. 2). When hydrated, the water resides in the permeable domains 50 of the polymer structure as a water cluster. The size of the permeable domains 50 can vary but typically is approximately 2-4 nanometers. During operation of the flow battery 20, hydronium ions diffuse over the surface of the water cluster in the permeable domain 50, but the central portions of the permeable domains 50 are open and free of obstacles. The open central portions of the permeable domains 50 can thus provide a pathway for the undesired permeation of vanadium (or other) active species through the membrane.

Figure 3:
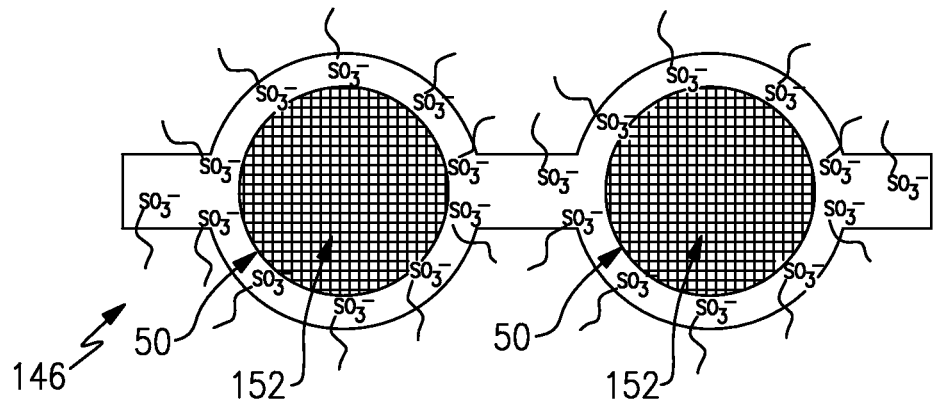
FIG. 3 shows a membrane with molecular barriers in the permeable domains.

FIG. 3 shows a modification in which the ion-exchange membrane 146 includes molecular barriers 152 in the permeable domains 50. The molecular barriers 152 influence permeability through the permeable domains 50. That is, the molecular barriers 152 still permit the desired permeation of the hydronium ions but are large enough to hinder permeation of the vanadium or other active species through the permeable domains 50. Thus, the ion-exchange membrane 146 has high ion conductivity yet also has high selectivity with respect to vanadium or other ions that tend to migrate through an ion exchange membrane.

The molecular barriers 152 can be provided as molecules that are covalently bonded to the acid groups, as free molecules that are physically caged within the permeable domains 50, or both. For example, the molecule or molecules of the molecular barriers 152 can include carbon chain molecules that are covalently bonded to the acid groups and extend off of the acid groups away from the base fluorinated carbon backbone chain that the side chain extends from. Thus, the carbon chain molecules extend from the acid groups into the permeable domains 50 and thus can serve to hinder migration of vanadium or other active species through the permeable domains 50. In further examples, the carbon chain molecules can include polar moieties, such as one or more hydroxyl moieties, to ensure that these carbon chains are hydrophilic and will therefore reside in the permeable domains 50 where they will effectively provide the barrier function to the vanadium or other active species.

Figure 4:
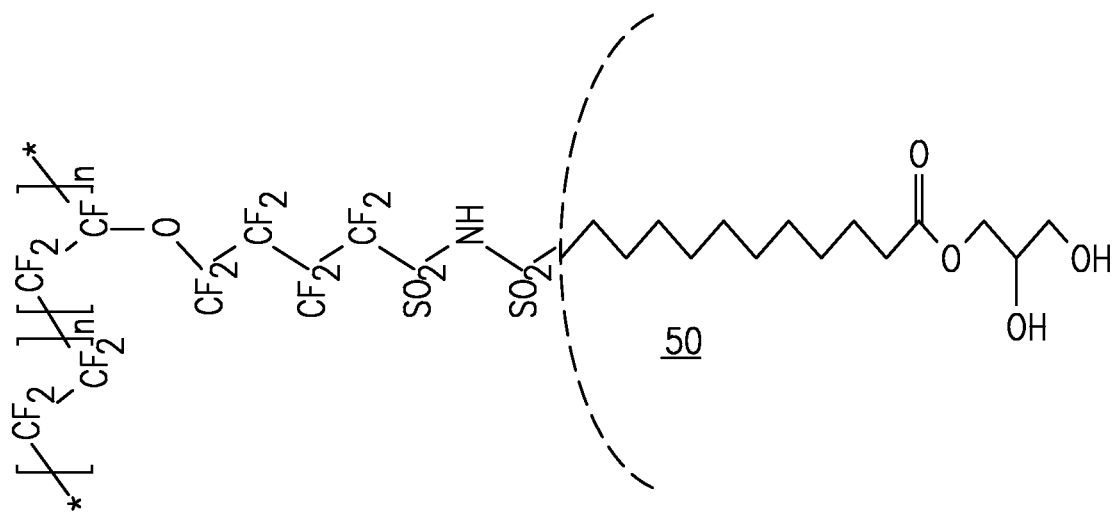
FIG. 4 illustrates a portion of the membrane with a carbon chain molecule covalently bonded to an acid group and that extends into the permeable domain.

In further examples, the carbon chain molecules can be selected from nonoxynol-9, pentaethylene glycol monodecyl ether, monolaurin, and combinations thereof. For example, as illustrated in FIG. 4, a sulfonic imide group —$SO_2$—NH—$SO_2$—, is shown with a carbon chain covalently bonded thereto and extending into the portion of the permeable domain 50 shown. In this example, the carbon chain is based on monolaurin that is covalently bonded to the sulfonic acid. Alternatively, or in addition to the covalently bonded groups, the carbon chain molecules, or non-carbon chain molecules, can be physically caged within the permeable domains 50 rather than covalently bonded to the acid groups.

Figure 5:
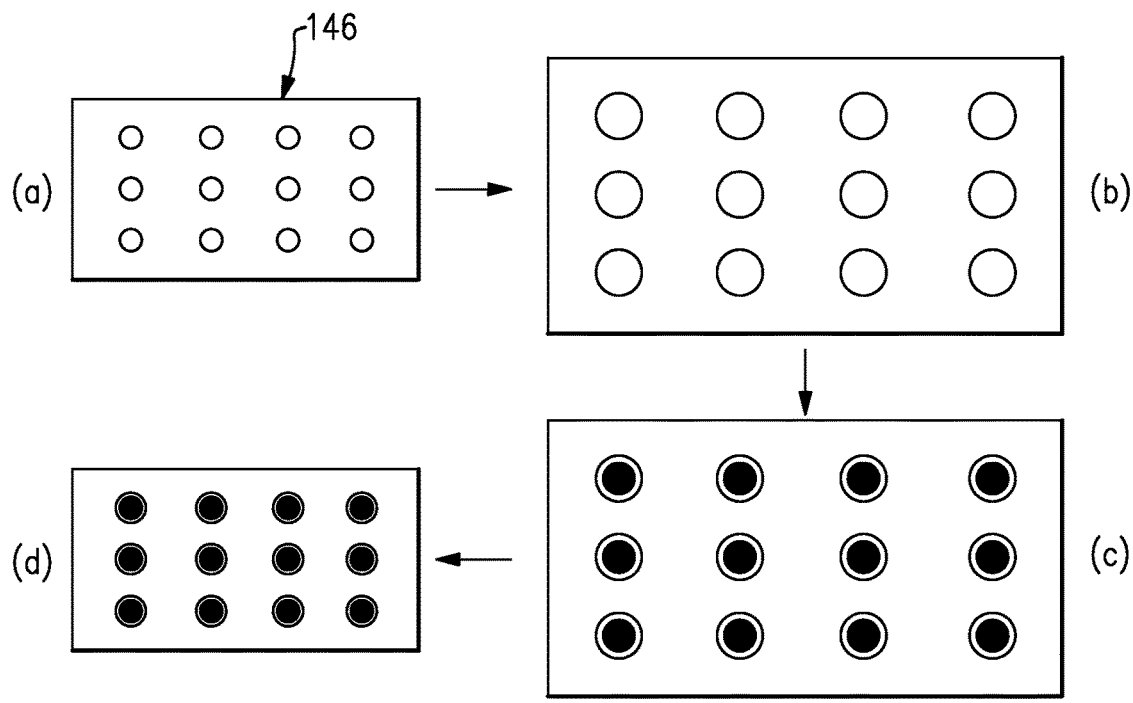
FIG. 5 illustrates an example method of fabricating an ion-exchange membrane with molecular barriers.

FIG. 5 schematically illustrates an example method of fabricating the ion-exchange membrane 146. Although the example is shown with (a)-(d), it is to be understood that the steps may be combined or used with additional processing steps. At step (a), the initial, non-treated membrane is provided. The membrane has the fluorinated carbon backbone chains and the fluorinated side chains extending off of the fluorinated carbon backbone chains, as described above. The fluorinated side chains include the acid groups. The initial membrane is then boiled at step (b) in acid and deionized water to hydrate the membrane and form the water clusters in the permeable domains 50. As an example, the membrane can be boiled in 0.5M sulfuric acid for approximately one hour and then soaked in deionized water for approximately one hour. As an alternative, the membrane can be soaked in a methanol-water mixture for approximately twelve hours. As can be appreciated, the technique of water infiltration can be varied.

At step (c), the hydrated membrane is soaked in an additive that includes a precursor for forming the molecular barriers 152. At step (d), the membrane is then dried at a temperature approximately equal to the glass transition temperature of the polymer of the membrane, to either physically cage the precursor to form the molecular barriers 152 and/or chemically react the precursors to covalently bond the molecular barriers 152, as described above.

Figure 6:
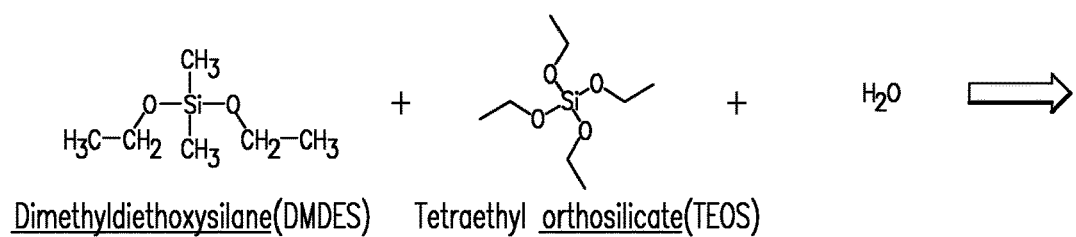
FIG. 6 illustrates an example of the method that utilizes sol-gel processing to form a siloxane network molecular barrier.
Figure 6:
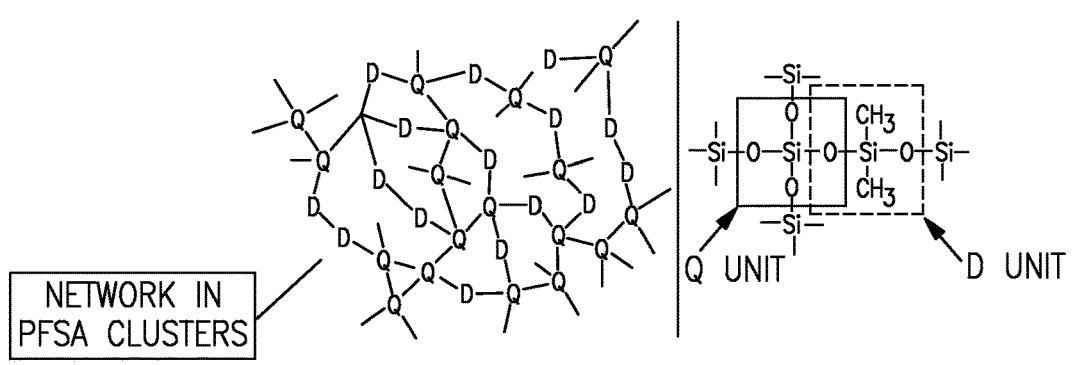
Figure 7:
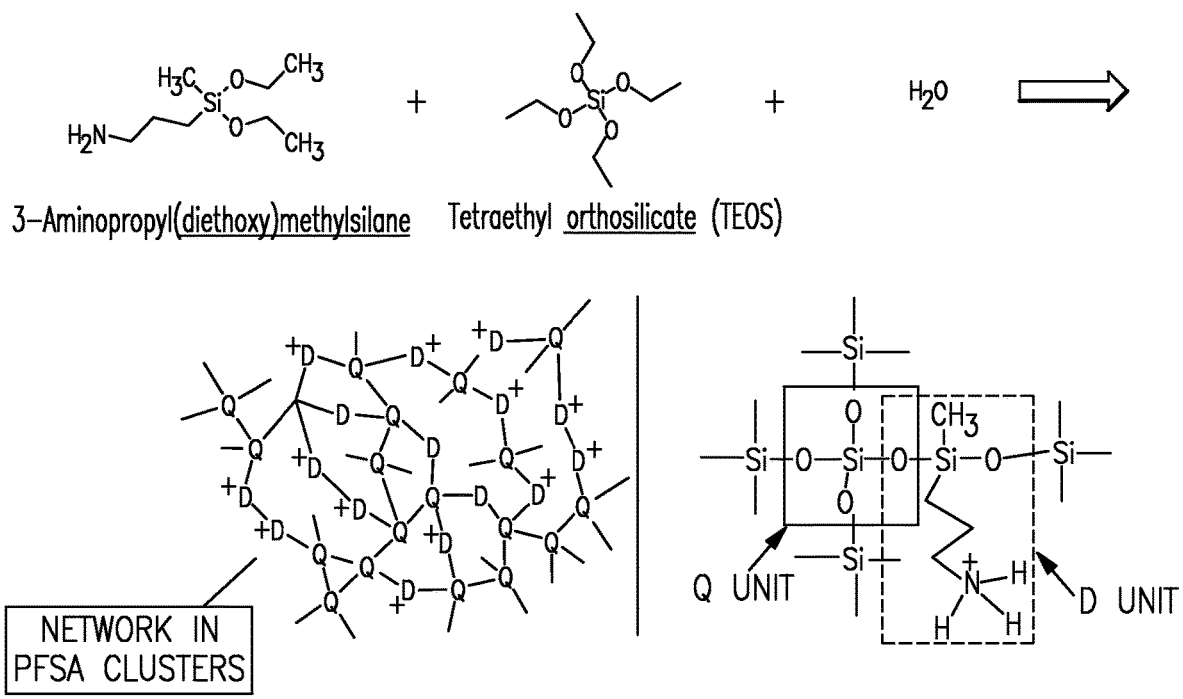
FIG. 7 illustrates another example of the method that also utilizes sol-gel processing to form another example siloxane molecular barrier.
Figure 8:
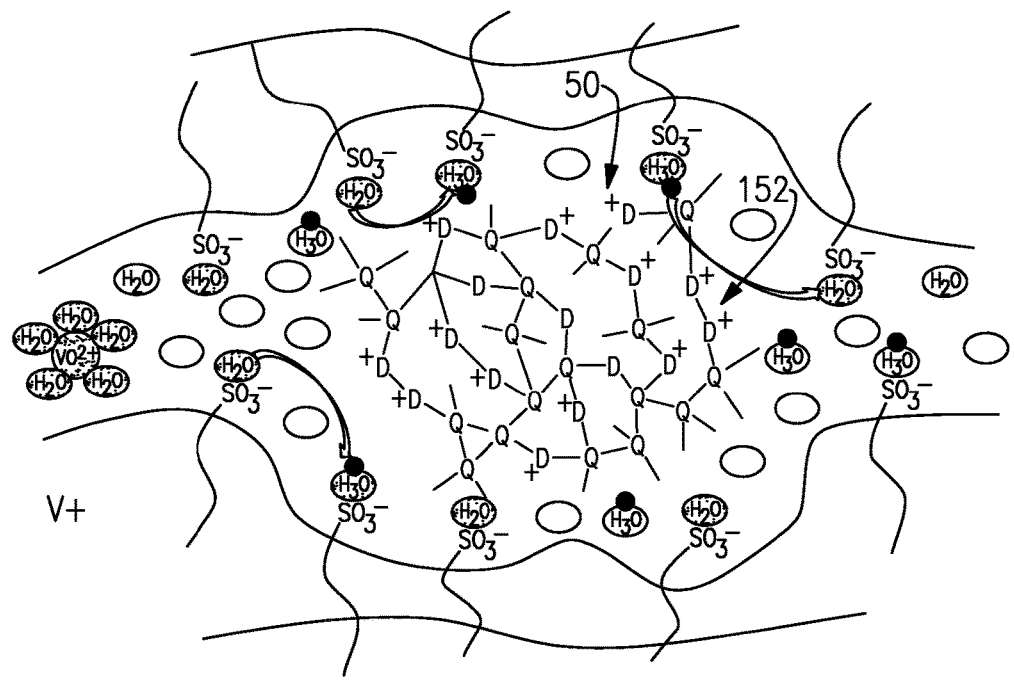
FIG. 8 illustrates an example of the permeable domain with a molecular barrier.

FIG. 6 schematically illustrates a further example of the method that includes formation of the molecular barriers 152 using sol-gel processing. In this example, the precursors that are infiltrated into the membrane at step (c) described above include dimethyldiethoxysilane (DMDES) and tetraethyl orthosilicate. Once infiltrated and dried, the precursors react to form a siloxane network that serves as the molecular barrier 152. FIG. 7 shows a modified example in which an amino is used instead of DMDES to form a different composition siloxane network as the molecular bather 152. Upon drying, the resulting siloxane network is physically caged within the permeable domain 50, as shown in FIG. 8, where the "D" and "Q" units are those represented in FIG. 7 or FIG. 8.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An ion-exchange membrane comprising:
   fluorinated carbon backbone chains;
   fluorinated side chains extending off of the fluorinated carbon backbone chains, the fluorinated side chains including acid groups for ionic conductivity, the acid groups surrounding and defining permeable domains which are free of the fluorinated carbon backbone chains; and
   molecular barriers in the permeable domains and influencing permeability through the permeable domains, the molecular barriers including at least one of nonoxynol-9, pentaethylene glycol monodecyl ether, and monolaurin.

2. The ion-exchange membrane as recited in claim 1, wherein the at least one of nonoxynol-9, pentaethylene glycol monodecyl ether, and monolaurin is covalently bonded to the acid groups and that extend off of the acid groups away from the fluorinated carbon backbone chains.

3. The ion-exchange membrane as recited in claim 2, wherein the carbon chain molecules include polar moieties.

4. The ion-exchange membrane as recited in claim 1, wherein the molecular barriers include molecules that are molecularly caged within the permeable domains.

5. The ion-exchange membrane as recited in claim 4, wherein the molecules include silicon.

6. The ion-exchange membrane as recited in claim 5, wherein the molecules include siloxane.

7. The ion-exchange membrane as recited in claim 1, wherein the molecular barriers are nonoxynol-9.

8. The ion-exchange membrane as recited in claim 1, wherein the molecular barriers are pentaethylene glycol monodecyl ether.

9. The ion-exchange membrane as recited in claim 1, wherein the molecular barriers are monolaurin.

10. A flow battery comprising:
at least one cell including a first electrode, a second electrode spaced apart from the first electrode and an electrolyte separator layer arranged between the first electrode and the second electrode;
a supply/storage system external of the at least one cell, the supply/storage system including first and second vessels fluidly connected with the at least one cell; and
first and second fluid electrolytes in the supply/storage system,
wherein the electrolyte separator layer includes an ion-exchange membrane of a polymer comprising fluorinated carbon backbone chains, fluorinated side chains extending off of the fluorinated carbon backbone chains, the fluorinated side chains including acid groups for ionic conductivity, the acid groups surrounding and defining permeable domains which are free of the fluorinated carbon backbone chains, and molecular barriers in the permeable domains and influencing permeability through the permeable domains, the molecular barriers including at least one of nonoxynol-9, pentaethylene glycol monodecyl ether, and monolaurin.

11. The flow battery as recited in claim 10, wherein the molecular barriers are nonoxynol-9.

12. The flow battery as recited in claim 10, wherein the molecular barriers are pentaethylene glycol monodecyl ether.

13. The flow battery as recited in claim 10, wherein the molecular barriers are monolaurin.

14. A method of fabricating an ion-exchange membrane, the method comprising:
providing a polymer membrane that has fluorinated carbon backbone chains and fluorinated side chains extending off of the fluorinated carbon backbone chains, the fluorinated side chains including acid groups for ionic conductivity, the acid groups surrounding and defining permeable domains which are free of the fluorinated carbon backbone chains; and
infiltrating the polymer membrane with an additive that includes a precursor, the additive infiltrating into the permeable domains; and
chemically converting the precursor to form molecular barriers in the permeable domains, the molecular barriers including at least one of nonoxynol-9, pentaethylene glycol monodecyl ether, and monolaurin.

15. The method as recited in claim 14, wherein the infiltrating includes soaking the polymer membrane in a solution that contains the additives.

16. The method as recited in claim 14, wherein the converting is by sol-gel conversion.

17. The method as recited in claim 14, including, prior to the infiltrating with the additive, infiltrating the polymer membrane with water.

18. The method as recited in claim 14, wherein the molecular barriers are nonoxynol-9.

19. The method as recited in claim 14, wherein the molecular barriers are pentaethylene glycol monodecyl ether.

20. The method as recited in claim 14, wherein the molecular barriers are monolaurin.

* * * * *